United States Patent [19]

Sack et al.

[11] 4,315,054

[45] Feb. 9, 1982

[54] CRACK-RESISTANT, HEAT-ABSORBING FUSION GLASSES ENABLING LOW PROCESSING TEMPERATURES FOR THE HERMETIC ENCAPSULATION OF ELECTRONIC COMPONENTS

[75] Inventors: Werner Sack; Otto Lindig, both of Mainz, Fed. Rep. of Germany

[73] Assignee: Schott Glaswerke, Mainz, Fed. Rep. of Germany

[21] Appl. No.: 173,799

[22] Filed: Jul. 30, 1980

[30] Foreign Application Priority Data

Jul. 30, 1979 [DE] Fed. Rep. of Germany ....... 2930912

[51] Int. Cl.³ .................... C03C 3/04; C03C 3/10
[52] U.S. Cl. .................... 428/433; 501/15.62; 156/89; 252/62.55; 428/900
[58] Field of Search .................... 106/53; 252/62.55; 335/153, 154; 428/433, DIG. 900; 156/89

[56] References Cited

U.S. PATENT DOCUMENTS

| | | | |
|---|---|---|---|
| 3,445,256 | 5/1969 | Dalton | 106/53 |
| 3,669,697 | 6/1972 | Drake et al. | 106/53 |
| 4,001,741 | 1/1977 | Lindig et al. | 106/53 |

FOREIGN PATENT DOCUMENTS 45-1186 1/1970 Japan .................... 106/53

OTHER PUBLICATIONS

Hoogendoorn, H. et al. "Infrared Absorbing Sealing Glasses" Ceramic Bull 48, No. 12 (1969) pp. 1125-1127.
Dalton, R. H. "How to Design Glass-to-Metal Joints" Product Engineering, Apr. 26, 1965, pp. 62-71, 428-433.

Primary Examiner—Helen M. McCarthy
Attorney, Agent, or Firm—Millen & White

[57] ABSTRACT

A fusion glass of the series $SiO_2$—$Al_2O_3$—$Na_2O$—$PbO$—$Fe_3O_4$ consists essentially of 43.0–46.2% by weight of $SiO_2$; 1.0–2.0% by weight of $Al_2O_3$; 6.2–16.0% by weight of $Na_2O$; 33.0–46.1% by weight of PbO; 2.0–4.5% by weight of $Fe_3O_4$; and a maximum of 0.2% by weight of $Sb_2O_3$, all calculated as percent by weight of oxide.

These heat-absorbing fusion glasses having a low softening point can be used especially for the hermetic encapsulation of electrotechnical components, especially of conductor contacts operated magnetically as well as nonmagnetically, having coefficients of thermal expansion in the temperature range of 20°–300° C. of about $8.4$–$12.2 \times 10^{-6}/°C$. and maximum heat absorption at about 1 to 1.5 μm. These glasses have softening temperatures (ST) of about 537° to 601° C., processing temperatures (PT) of about 763° to 879° C., and a lower tendency toward varporization during the fusion process. The fusion stresses between the metallic conductor and the glass, existing after the fusion process and occurring upon rapid cooling in air and after a 5° C./min cooling step, are characterized by a maximum tensile stress corresponding to an optical path difference of $\leq 400$ nm/cm, at a specific birefringence of about $(2.7 \pm 0.1) \times 10^{-6}$ mm²/N.

3 Claims, 6 Drawing Figures

CRACK-RESISTANT, HEAT-ABSORBING FUSION GLASSES ENABLING LOW PROCESSING TEMPERATURES FOR THE HERMETIC ENCAPSULATION OF ELECTRONIC COMPONENTS

BACKGROUND OF THE INVENTION

The present invention relates to novel heat-absorbing fusion glasses for the encapsulation of electrotechnical components.

Fusion glasses having a specific IR absorption due to doping with FeO and which can be processed hot by mere radiant heating with quartz-iodine lamps, are preferably used for the hermetic encapsulation of magnetically operated contacts (reed switches) and have been part of the state of the art for more than a decade.

The metal alloys employed (determined largely by the properties required for the end use) and the techniques and to manufacture such reed switches have resulted, in the last decade, in a series of diverse requirements on the properties of fusion glasses. From these demands there have evolved a group of reed glasses which, in some aspects, are very different.

Among these requirements was primarily the avoidance of lead oxide which vaporizes most readily at normal processing temperatures of about 1000° C. and quickly changes the effective radiation transmittance by its condensation on windows and mirrors. Further required was the minimizing of other readily vaporizable components, such as $K_2O$, $B_2O_3$ and $F_2$, which can lead to troublesome condensates in the switch chamber.

A novel way to solve the problem posed by these requirements was provided by the development of glasses having an extremely low softening point (German Pat. No. 2,503,793), whereby the vaporization of glass components such as $K_2O$, PbO, $B_2O_3$ and $F_2$ could be suppressed adequately by use of correspondingly low processing temperatures. Furthermore, these low softening point glasses provided the opportunity for use of magnetic alloys (semihard alloys) in reed switches. The magnetic properties of these alloys are critically dependent on their heating history, so that they would be unduly altered at the fusion temperatures required by normal reed glasses.

However, these developments and improvements of reed glasses have not yet provided a solution to the problem of the crack sensitivity of these glasses. Such cracks can arise during wire sealing due to excess stresses during cooling, during the tin-plating of the wires and during exposure of the switch to alternating temperature stresses while in use. These cracks, further, frequently represent a significant waste factor during the manufacture of reed switches. The tensile stresses which cause such cracks result from the difference in the degree of contraction of metal and glass. For the metal alloys customarily used in reed switches, these stresses have a temperature dependence illustrated by the curve of FIG. 1.

If the room temperature (RT) stress caused by the desired and necessary radial forces as well as the permissible glass stresses is fixed by the selection of the glass-metal partners, then, for a given fusion geometry and a fixed cooling rate, the curve of the stress in dependence on the temperature is likewise predetermined.

The level of maximum tensile stress and the values of the tangential tensile stress occurring during the subsequent operating temperature govern the crack sensitivity of the wire seals during cooling and during use. Depending upon the desired or necessary radial compressive strain involved in the operating range, corresponding axial and tangential tensile stresses in the glass occur in this range.

Even if the wire sealing step withstands the shortterm stress of $\sigma_{z, max}$ (FIG. 1), for example during rapid cooling in air, nevertheless, cracks can still occur in the glass due to the great dependency of the glass strength on the longer term stresses occuring during relatively long or repeated stays at a given temperature $<T(-\sigma_{max})$. Besides the temperatures of the normal use of reed switches, such increased and dangerous temperature loads occur, for example, in cleansing baths and during the tin-coating of the wires.

If wire fusion seals are to have crack resistance under such temperature loads, it is necessary to provide a low value for $\sigma_{z, max}$ and/or a low steepness of the polarimeter curve between RT and T ($\sigma_{z,max}$). (See FIG. 2).

A prerequisite for this is that the glass solidify during cooling at a time which corresponds as closely as possible to that of the quasilinear portion of the expansion curve of the metal (the small intersecting angle between the contraction curves). In this way, the maximum contraction difference after reaching the glass point, influenced by the above-described maximum stress, will remain as small as possible (curve 2 in FIG. 2).

The position of this transition temperature $T_G$ (a fictitious variable which is used as a substitute means for describing a practically constantly progressing solidification process by viscosity increase) in relation to the contraction curve of the glass in the transformation range is caused by relaxation mechanisms extensively dependent on the glass composition. Accordingly, $T_G$ also depends on the cooling rate, and, thus, the contraction difference in glass-metal fusions and the associated temperature dependent stress curve also prove to be dependent on the cooling rate (see FIG. 3).

SUMMARY

It is an object of the present invention to provide glasses in the system $SiO_2$—$Al_2O_3$—$Na_2O$—PbO—$Fe_3O_4$ wherein, due to more favorable transition-point characteristics in accordance with the foregoing, inordinately low contraction differences occur between these glasses and the metal alloys customarily used for reed switches so that, with suitable glass-metal combinations, polarimeter curves having low $\sigma_{z,max}$ values can be attained which, additionally, exhibit an extraordinarily low temperature dependency.

Upon further study of the specification and appended claims, further objects and advantages of this invention will become apparent to those skilled in the art.

These objects have been attained by providing fusion glasses of the series $SiO_2$—$Al_2O_3$—$Na_2O$—PbO—$Fe_3O_4$ consisting essentially of 43.0–46.2% by weight of $SiO_2$; 1.0–2.0% by weight of $Al_2O_3$; 6.2–16.0% by weight of $Na_2O$; 33.0–46.1% by weight of PbO; 2.0–4.5% by weight of $Fe_3O_4$; and a maximum of 0.2% by weight of $Sb_2O_3$, calculated as percent by weight of oxide.

These heat-absorbing fusion glasses having a low softening point can be used especially for the hermetic encapsulation of electrotechnical components, especially of conductor contacts operated magnetically as well as nonmagnetically, having coefficients of thermal expansion in the temperature range of 20°–300° C. of about 8.4–12.2×10$^{-6}$/°C. and maximum heat absorption at about 1 to 1.5 μm. These glasses have softening temperatures (ST) of about 537° to 601° C., processing temperatures (PT) of about 763° to 879° C., and a lower tendency toward vaporization during the fusion process. The fusion stresses between the metallic conductor and the glass existing after the fusion process, and occurring upon rapid cooling in air and after a 5° C./min cooling step, are characterized by a maximum tensile stress corresponding to an optical path difference of ≦400 nm/cm, at a specific birefringence of about $(2.7\pm0.1)\times10^{-6}$ mm$^2$/N.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
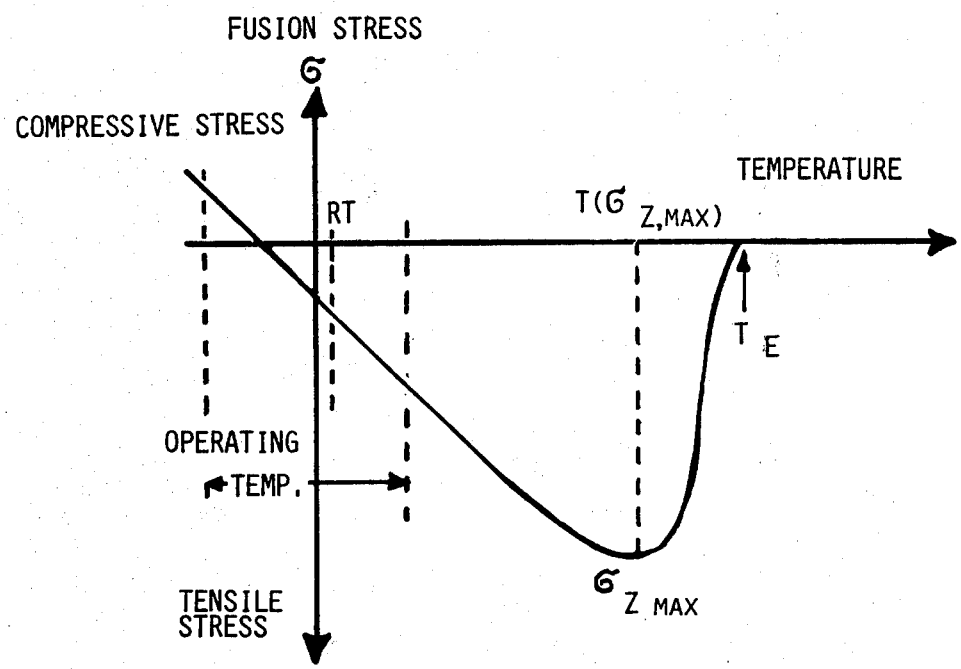
FIG. 1 displays a theoretical curve of axial and tangential stresses in glass during metal wire fusion sealing in dependence on the temperature.
Figure 2:
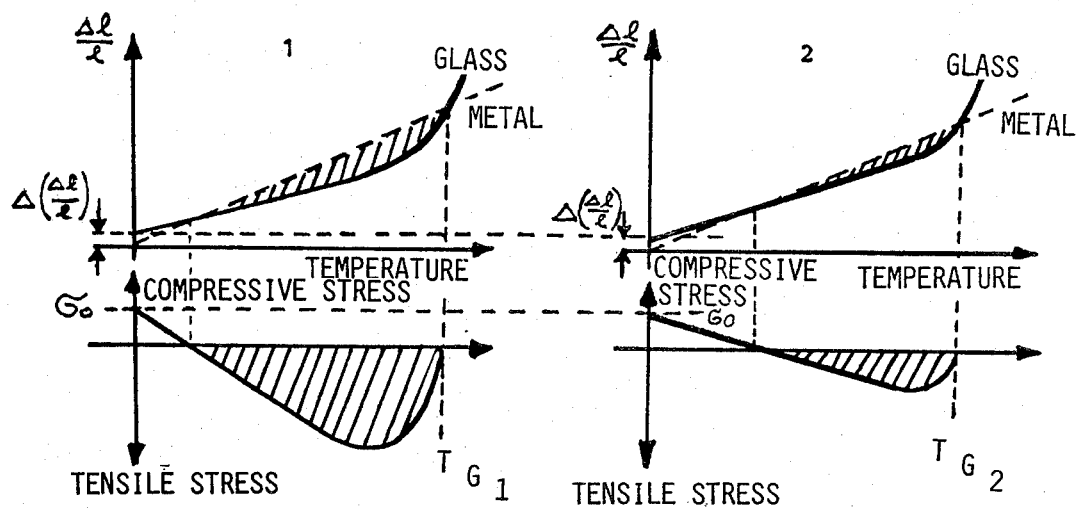
FIG. 2 displays attainable polarimeter curves at a high (1) and low (2) glass transition temperature, $T_G$, with a given identical final stress $\sigma_o$ and a linear curve of metal expansion.
Figure 3:
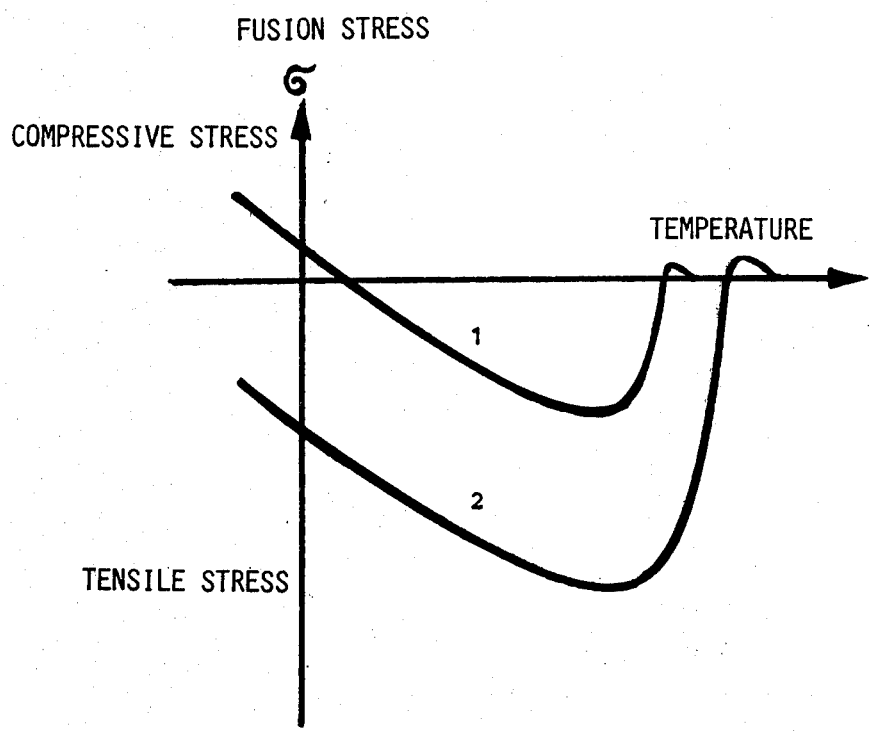
FIG. 3 shows a theoretical shift of the polarimeter curves during gradual (1) and rapid (2) cooling at an approximately linear thermal expansion of the metal component.

The fusion stresses resulting after the step of fusion of the metallic conductor and the glasses of this invention, during a rapid cooling in air as well as after a 5° C./min cooling step, both from a temperature of about 450°–550° C., show maximum tensile stress values corresponding to an optical path difference of ≦400 nm/cm, with a specific birefringence of the glasses of $(2.7\pm0.1)\times10^{-6}$ mm$^2$/Newton. In contradistinction, prior art glasses lead to maximum tensile stress values of >400 nm/cm.

The primary characteristic difference between the glasses of this invention and those of the state of the art (for example German Pat. No. 2,503,783 and French Pat. No. 1,451,798) is that those of this invention contain as alkalis only an amount of Na$_2$O of 6.2–16.0% by weight, with a simultaneous content of 33–46.1% by weight of PbO, 43–46.2% by weight of SiO$_2$, 1–2% by weight of Al$_2$O$_3$, 2.0–4.5% by weight of Fe$_3$O$_4$, and maximally 0.2% by weight of Sb$_2$O$_3$. Thereby, the glasses of this invention enable use of processing temperatures which are so low that the amounts of PbO and Na$_2$O necessary to obtain a low $\sigma_{Z,max}$ values are not subject to troublesome vaporization during the heat processing step, so that these glasses, in comparison to commercially available types, can even serve as low-vaporizable ones.

In contradistinction, prior art, iron-doped lead glasses with contents of 28–30% by weight of PbO, as is known, at the required processing temperatures in the range from 900° C. to 1000° C., display such high lead evaporation that voluminous technological measures must be taken during the automatic heat molding step, such as a short-term cleaning or exchanging of the mirrors. In comparison, the glasses of this invention with a high lead content represent a substantial improvement, in that such technical measures or interruptions in the manufacturing procedures can be extensively omitted due to the fact that they involve a far lower amount of vaporization at the required processing temperatures.

Unless otherwise indicated herein, the manufacture of the fusion glasses of the invention can be conducted by fully conventional procedures utilized for the preparation of other conventional fusion glasses of the series SiO$_2$—Al$_2$O$_3$—Na$_2$O—PbO—Fe$_3$O$_4$.

Similarly, the use of the fusion glasses of this invention in encapsulating metal components is in accordance with fully conventional procedures except for the differences discussed above derived from their advantageous properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following table shows a compilation of 6 exemplary compositions of this invention and their properties:

| Composition Examples Nos. 1–6 in Percent by Weight: | | | | | | |
|---|---|---|---|---|---|---|
| Components Properties | No. 1 | No. 2 | No. 3 | No. 4 | No. 5 | No. 6 |
| SiO$_2$ | 43.0 | 43.0 | 46.0 | 46.2 | 46.2 | 46.2 |
| Al$_2$O$_3$ | 1.5 | 1.8 | 2.0 | 1.0 | 1.0 | 1.0 |
| Na$_2$O | 6.2 | 7.5 | 9.0 | 11.5 | 14.0 | 16.0 |
| PbO | 46.1 | 45.7 | 39.7 | 37.5 | 35.0 | 33.0 |
| Fe$_3$O$_4$ | 3.2 | 2.0 | 3.3 | 3.8 | 3.8 | 3.8 |
| Sb$_2$O$_3$ | 0.2 | 0.2 | 0.2 | 0.2 | 0.2 | 0.2 |
| Percent Sum Total | 100.2 | 100.2 | 100.2 | 100.2 | 100.2 | 100.2 |
| $\alpha \times 10^6$ (20–300° C.)/°C. | 8.4 | 9.24 | 9.31 | 10.4 | 11.4 | 12.2 |
| $T_g$ (°C.); $\eta \sim 10^{13.5}$ poises | 432 | 426 | 434 | 418 | 411 | 410 |
| ST (°C.); $\eta = 10^{7.6}$ poises | 601 | 584 | 591 | 571 | 555 | 537 |
| PT (°C.); $\eta = 10^4$ poises | 879 | 843 | 856 | 817 | 800 | 763 |
| Density (g/cc) | 3.67 | 3.73 | 3.42 | 3.39 | 3.38 | 3.33 |
| $T_{K100}$ (°C.) | 315 | 315 | 248 | 230 | 203 | 184 |
| $\tau$ for 0.5 mm Thickness at 1100 nm (%) | 39 | 33 | 15 | 27 | 20 | 26 |

Figure 4:
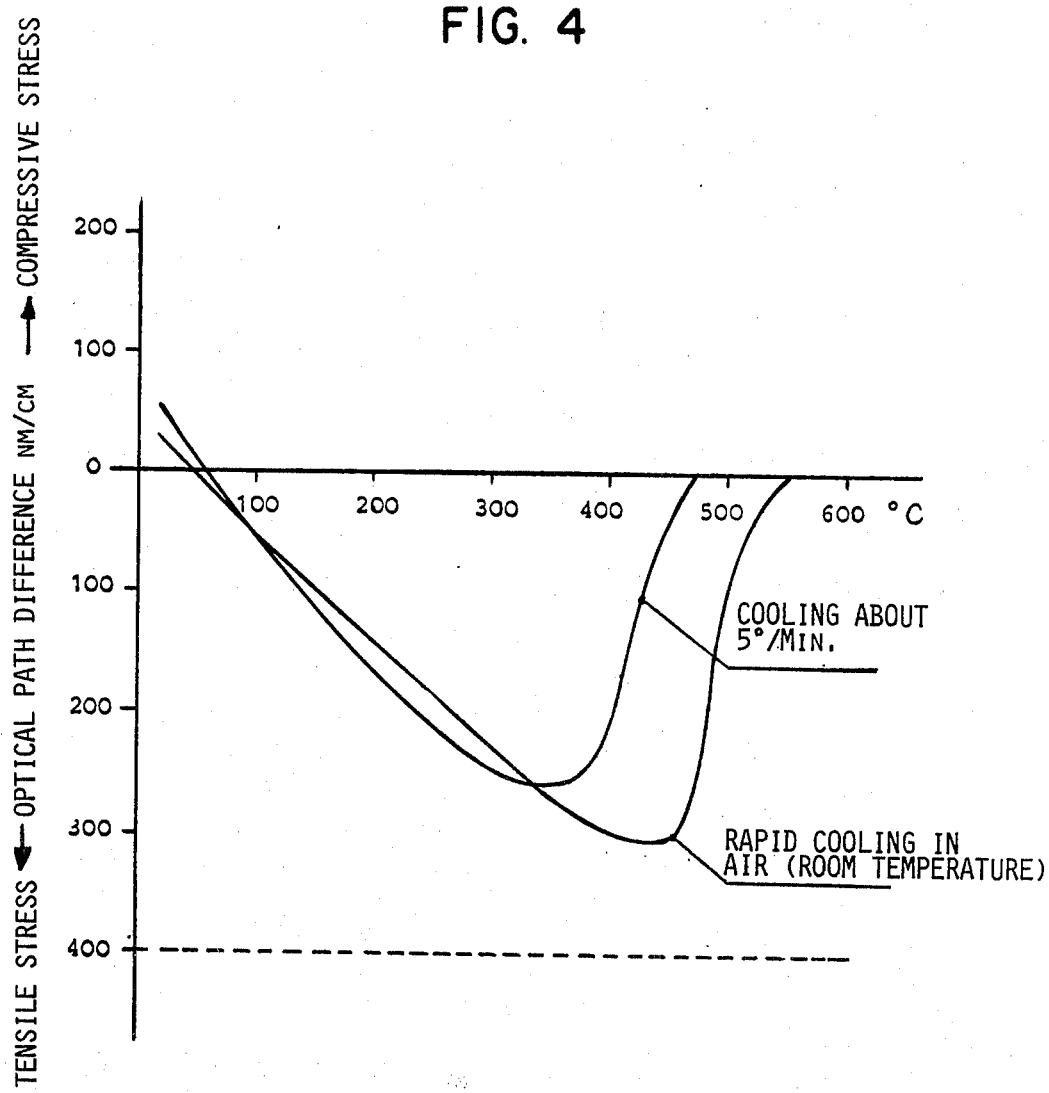
FIGS. 4–6 display the temperature dependent stress curves of several combinations of metallic components and fusion glasses of this invention.
Figure 5:
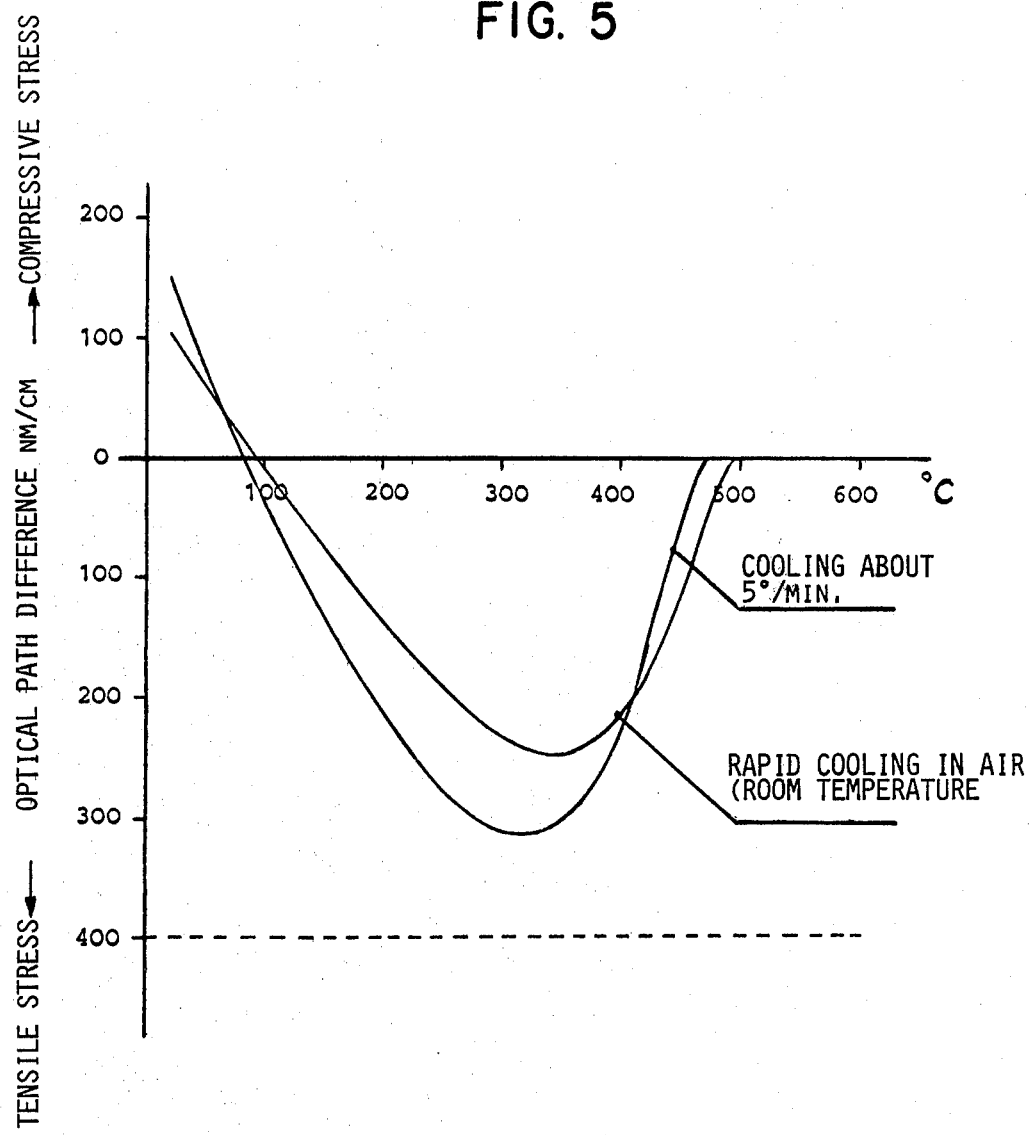
Figure 6:
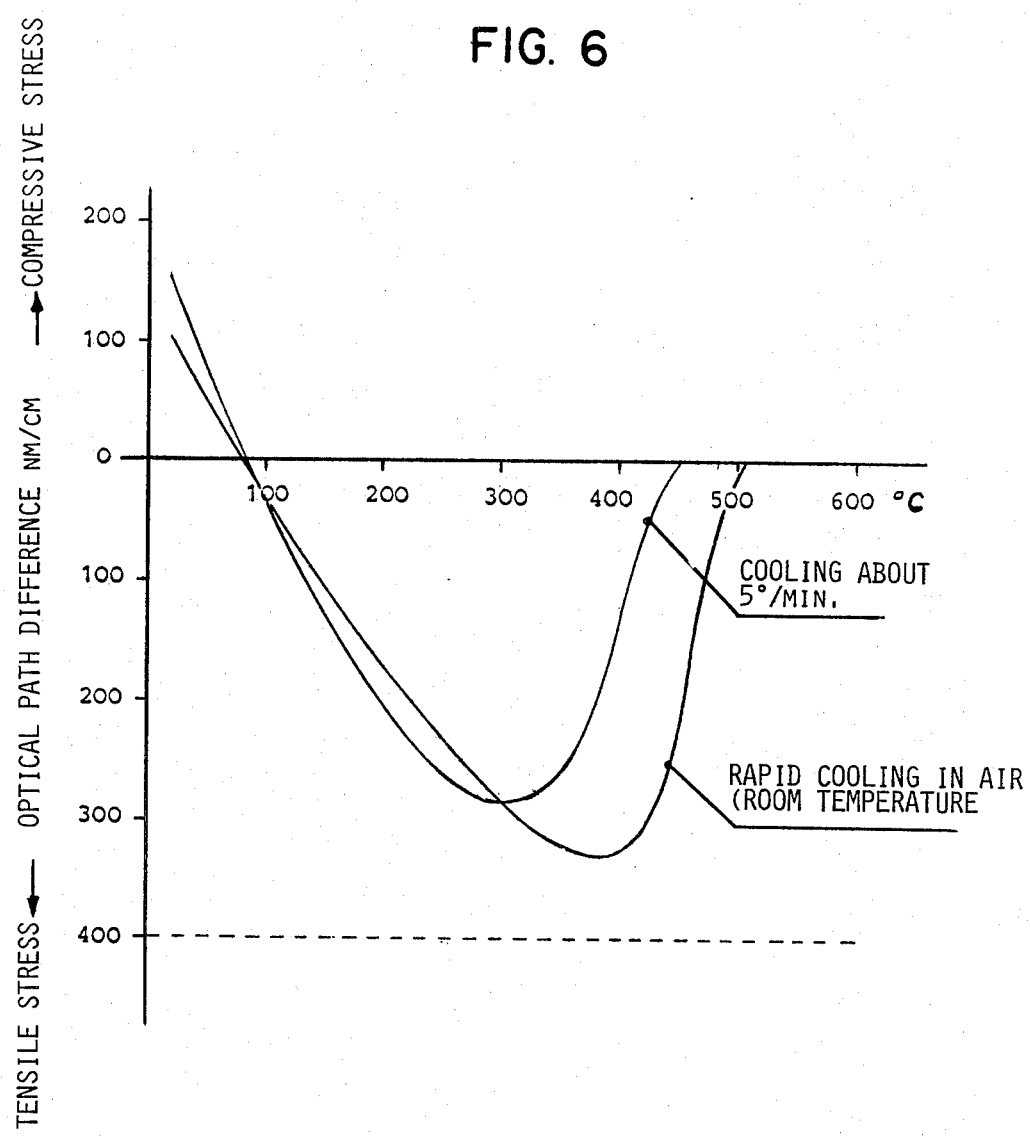

The fusion stresses of glasses No. 3 and No. 5 in conjunction with various metal alloys are indicated in FIGS. 4, 5, and 6. Each illustration shows the optical path differences, each based on a glass thickness of 1 cm, corresponding to the axial stresses in the glass in a twin-wire seal. The curves shown for each fusion combination correspond to a cooling of the fusion sample at 5° C./min, as well as to a free cooling of the sample in ambient air (rapid cooling). Specifically, the following glasses and metal alloys were fused:

FIG. 4: Glass No. 3 with a magnetic alloy consisting of 48.5% iron, 48.5% cobalt and 3% vanadium; wire thickness and spacing: 0.6 mm.

FIG. 5: Glass No. 3 with an alloy consisting of 52% nickel and 48% iron; wire thickness and spacing: 1.0 mm.

FIG. 6: Glass No. 5 with a magnetic alloy consisting of 12% iron, 3% niobium, maximally 0.3% tantalum, and about 85% cobalt; wire thickness and spacing: 0.6 mm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fusion glass of the series $SiO_2$—$Al_2O_3$—$Na_2O$—$PbO$—$Fe_3O_4$ consisting essentially of 43.0–46.2% by weight of $SiO_2$; 1.0–2.0% by weight of $Al_2O_3$; 6.2–16.0% by weight of $Na_2O$ which is the only alkali metal oxide; 33.0–46.1% by weight of PbO; 2.0–4.5% by weight of $Fe_3O_4$; and a maximum of 0.2% by weight of $Sb_2O_3$, all calculated as percent by weight of oxide; the glass being heat absorbing, having a softening temperature of 537°–601° C., and fusing to metallic electronic conductor contacts in a hermetic seal at low fusion processing temperatures of 763°–879° C. whereby minimal vaporization of glass components occurs, the encapsulated metallic contacts so produced having stresses between the metallic conductor and the fusion glass, which upon subjection to rapid cooling in air or to cooling at 5° C./min, are characterized by a maximum tensile stress corresponding to an optical path difference of $\leq 400$ nm/cm, at a specific birefringence of $(2.7\pm0.1)\times 10^{-6}$ mm$^2$/N, said metallic contacts having a coefficient of thermal expansion at 20°–300° C. of $8.4$–$12.2\times 10^{-6}$/°C. and a maximum heat absorption at 1 to 1.5 μm.

2. A metallic, electronic conductor contact encapsulated in a fusion glass of claim 1.

3. An encapsulated metallic contact of claim 2 wherein the metal contact is magnetic.

* * * * *